US012625313B2

(12) United States Patent
Johnson et al.

(10) Patent No.: US 12,625,313 B2
(45) Date of Patent: May 12, 2026

(54) POLYESTER COPOLYMERS FOR USE IN OPTICAL FILMS

(71) Applicant: 3M INNOVATIVE PROPERTIES COMPANY, St. Paul, MN (US)

(72) Inventors: Stephen A. Johnson, Woodbury, MN (US); Carl A. Stover, St. Paul, MN (US); Kristopher J. Derks, Woodbury, MN (US); Richard Yufeng Liu, Woodbury, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 805 days.

(21) Appl. No.: 17/772,546

(22) PCT Filed: Nov. 23, 2020

(86) PCT No.: PCT/IB2020/061041
§ 371 (c)(1),
(2) Date: Apr. 28, 2022

(87) PCT Pub. No.: WO2021/105852
PCT Pub. Date: Jun. 3, 2021

(65) Prior Publication Data
US 2022/0381964 A1     Dec. 1, 2022

Related U.S. Application Data

(60) Provisional application No. 62/941,107, filed on Nov. 27, 2019.

(51) Int. Cl.
*G02B 5/30*          (2006.01)
*C08J 5/18*          (2006.01)

(52) U.S. Cl.
CPC ............... *G02B 5/305* (2013.01); *C08J 5/18* (2013.01); *C08J 2367/02* (2013.01)

(58) Field of Classification Search
CPC .... G02B 5/3058; G02B 5/305; G02B 5/3066; G02B 5/3083; G02B 5/3041; G02B 5/3025; C08J 5/18; C08J 2367/02
See application file for complete search history.

(56) References Cited

U.S. PATENT DOCUMENTS

| | | | |
|---|---|---|---|
| 4,162,343 A | 7/1979 | Wilcox et al. | |
| 5,882,774 A | 3/1999 | Jonza et al. | |

(Continued)

FOREIGN PATENT DOCUMENTS

| | | |
|---|---|---|
| WO | 2002034514 A1 | 5/2002 |
| WO | 2009134595 A1 | 11/2009 |

(Continued)

OTHER PUBLICATIONS

International Search Report for PCT International Application No. PCT/IB2020/061041, mailed on Feb. 9, 2021, 3 pages.

*Primary Examiner* — Sharrief I Broome
*Assistant Examiner* — Journey F Sumlar
(74) *Attorney, Agent, or Firm* — Clifton F. Richardson

(57) ABSTRACT

Polyester copolymeric materials include 40 to 51 mol % substituted naphthalate units, such as dimethyl-2,6-naphthalene dicarboxylate units, 10 to 40 mol % ethylene units, and 10 to 40 mol % hexane units. The polyester copolymers can be used to prepare multi-layer optical films by coextrusion and/or co-stretching. The copolyester polymeric materials have desirable optical properties and permit thermal processing at lower temperatures.

11 Claims, 3 Drawing Sheets

(56)                    References Cited

U.S. PATENT DOCUMENTS

| | | | |
|---|---|---|---|
| 6,630,283 | B1 | 10/2003 | Simpson |
| 7,345,137 | B2 | 3/2008 | Hebrink et al. |
| 8,012,571 | B2 | 9/2011 | Liu et al. |
| 8,263,731 | B2 | 9/2012 | Liu et al. |
| 9,664,834 | B2 | 5/2017 | Bösl et al. |
| 2001/0011779 | A1 | 8/2001 | Stover |
| 2004/0032658 | A1* | 2/2004 | Fleming ............ B32B 17/10174 |
| | | | 359/489.15 |
| 2006/0228559 | A1 | 10/2006 | Denker |
| 2007/0047080 | A1 | 3/2007 | Stover et al. |
| 2009/0273836 | A1 | 11/2009 | Yust |
| 2014/0016208 | A1 | 1/2014 | Edmonds et al. |
| 2022/0091316 | A1* | 3/2022 | Long ..................... G02B 5/208 |

FOREIGN PATENT DOCUMENTS

| | | | | | |
|---|---|---|---|---|---|
| WO | | 2013148124 | A1 | 10/2013 | |
| WO | WO-2019123141 | A1 | * | 6/2019 | ........... G02B 27/285 |
| WO | | 2020222053 | A1 | 11/2020 | |

* cited by examiner

POLYESTER COPOLYMERS FOR USE IN OPTICAL FILMS

CROSS REFERENCE TO RELATED APPLICATIONS

This application is a national stage filing under 35 U.S.C. 371 of PCT/IB2020/061041, filed Nov. 23, 2020, which claims the benefit of Provisional Application No. 62/941,107, filed Nov. 27, 2019, the disclosures of which are incorporated by reference in their entireties herein.

FIELD OF THE DISCLOSURE

The current application relates to polyester copolymers for use in optical films.

BACKGROUND

Polymeric films are used in a wide variety of applications. One particular use of polymeric films is in optical films to control light. Examples of optical film that control light include mirrors and reflective polarizers that reflect light of a given polarization or wavelength range. Such reflective films are used, for example, in conjunction with backlights in liquid crystal displays to enhance brightness. A reflective polarizing film may be placed between the user and the backlight to recycle the polarization state that becomes an image, thereby increasing brightness. A mirror film may be placed behind the backlight to reflect light towards the user; thereby enhancing brightness. Another use of polarizing films is in articles, such as sunglasses, to reduce light intensity and glare.

One type of polymer that is useful in creating polarizer or mirror films is a polyester. One example of a polyester-based polarizer includes a stack of polyester layers of differing composition. One configuration of this stack of layers includes a first set of birefringent layers and a second set of layers with an isotropic index of refraction. The second set of layers alternates with the birefringent layers to form a series of interfaces for reflecting light.

SUMMARY

The current application relates to polyester copolymers for use in optical films. The copolyester polymeric material comprise 40 to 51 mol % substituted naphthalate units, 10 to 40 mol % ethylene units, and 10 to 40 mol % hexane units. In some embodiments the substituted naphthalate units comprise dimethyl-2,6-naphthalene dicarboxylate.

The polyester copolymers can be used to prepare multi-layer optical films by coextrusion and/or co-stretching.

BRIEF DESCRIPTION OF THE DRAWINGS

The disclosure may be more completely understood in consideration of the following detailed description of various embodiments of the disclosure in connection with the accompanying drawings, in which.

Figure 1:
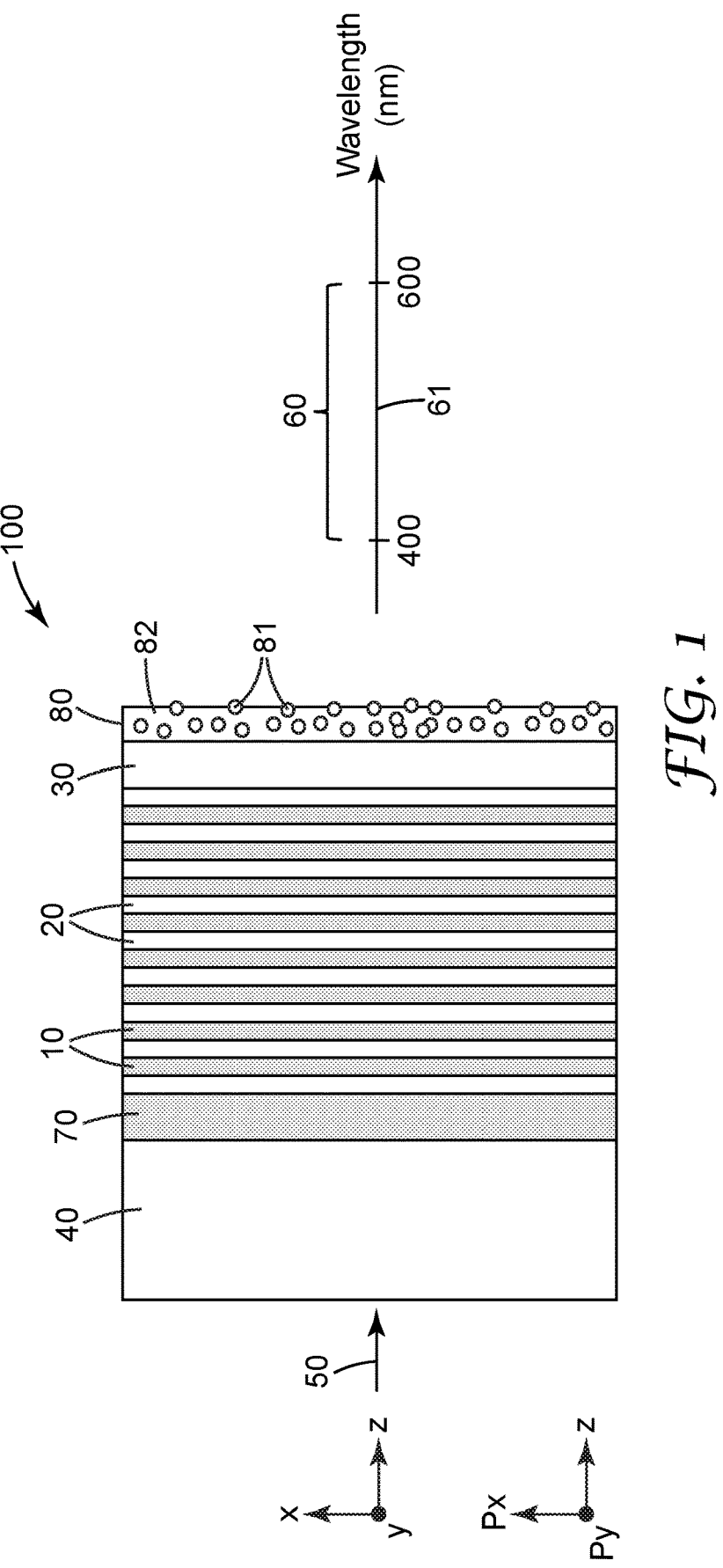
FIG. 1 is a cross-sectional view of a multi-layer optical film of this disclosure.

While the disclosure is amenable to various modifications and alternative forms, specifics thereof have been shown by way of example in the drawings and will be described in detail. It should be understood, however, that the intention is not to limit the disclosure to the particular embodiments described. On the contrary, the intention is to cover all modifications, equivalents, and alternatives falling within the spirit and scope of the disclosure as defined by the appended claims.

DETAILED DESCRIPTION

Polymeric films are used in a wide variety of optical applications. Among uses of polymeric films is in mirrors and reflective polarizers that reflect light of a given polarization or wavelength range. Such reflective films are used, for example, in conjunction with backlights in liquid crystal displays to enhance brightness. A reflective polarizing film may be placed between the user and the backlight to recycle the polarization state that becomes an image, thereby increasing brightness. A mirror film may be placed behind the backlight to reflect light towards the user; thereby enhancing brightness. Another use of polarizing films is in articles, such as sunglasses, to reduce light intensity and glare.

One type of polymer that is useful in creating polarizer or mirror films is a polyester. One example of a polyester-based polarizer includes a stack of polyester layers of differing composition. One configuration of this stack of layers includes a first set of birefringent layers and a second set of layers with an isotropic index of refraction. The second set of layers alternates with the birefringent layers to form a series of interfaces for reflecting light.

It is often desirable for the multi-layer reflective polarizer films to include relatively thick and rigid outer layers to serve to increase the rigidity and handleability of these films, especially since the individual layers of the multi-layer reflective polarizer films are so thin (typically, 55 to 130 nanometers) and in some instances there are relatively few layers. Typically, relatively thick and rigid outer layers are laminated to the multi-layer reflective polarizer films. There are a number of disadvantages to lamination of outer layers to multi-layer reflective polarizer films. Lamination is an extra step in the formation of the film article, and thus can add cost and manufacturing time to the preparation of the film articles. Also, lamination can add defects to film articles. Often adhesives are required to adhere the outer layer to the multi-layer reflective polarizer films, which again adds cost to the prepared articles and the presence of the adhesive layer can adversely affect the optical properties of the formed article. Additionally, often the outer layers are prepared from polymeric materials such as polycarbonates or polyesters that tend to add expense to the film articles. As mentioned above, the outer layers are relatively thick to provide the desired rigidity to the formed articles, and therefore the outer layers comprise a substantial portion of the mass of the formed article.

It would be desirable to utilize a relatively inexpensive polyester material in optical films such as mirror and reflective polarizer films. However, in order to achieve the desired optical effects and prepare optical films by co-extrusion, polyester materials have issues. Polyethylene Terephthalate (PET) is not co-stretchable with typical Reflective Polarizers (RPs). In typical RPs the high index optics (HIO) material is polyethylene naphthalate (PEN) or a Co-polyethylene naphthalate (CoPEN) with a high mole fraction of the diacid being naphthalene dicarboxylate (NDC) (>75 mole %). If PET is co-stretched with RPs the temperature required is so high (~137 to 160° C. according to U.S. Pat. No. 5,882,774) that PET crystallizes before it is stretched. This type of crystallization is often called thermally induced crystallization instead of strain induced crystallization. This thermally crystallized PET is undesirable for a number of reasons. Thermally crystallized PET is hazy due to the presence of large crystallites, it tends to break before it is fully elongated when stretched in a tenter, and it does not have the excellent mechanical properties of strain hardened PET (high modulus and crystalline). A typical temperature for one dimensional orientation of reflective polarizers is 137 to 160° C. (based on examples in U.S. Pat. No. 5,882,774 with HIO being PEN). Multi-layer reflective polarizers typically use an HIO composed of PEN or CoPENs that are composed of 90 mole % or more of NDC. For colder temperatures the HIO will break or be hazy. Typical one-dimensional orientation temperatures for PET are 95° C. (see U.S. Pat. No. 9,664,834). Thus, there is clearly no overlap in the orientation temperatures between that used for HIOs that demonstrate the high birefringence required for RPs and PET which has low cost and good mechanical properties for rigid films. Thus, the use of PET in the films of this disclosure is unexpected.

In this disclosure, optical films are described that include multi-layer reflective polarizer films that include skin layers that are prepared from polyester materials of PET (polyethylene terephthalate) and are co-extruded with the optically active micro-layers so that additional outer layer lamination is not required. The multi-layer reflective polarizer films may be mirror-like films which reflect essentially all light or reflective polarizer films that reflect light of one polarity and transmit light of an orthogonal polarity. The polyester materials in the skin layers permit the preparation of the optical films by coextrusion and therefore avoid the added cost and time of lamination processes. Additionally, the relatively low cost of PET materials reduces the cost of the formed articles relative to articles formed with more expensive skin layers. Additionally, since the PET skin layers have compatible stretching properties to the optically active layers of the multi-layer portion of the films, the co-extruded articles can be stretched to form film articles that have the desired optical and physical properties.

Also disclosed herein are polyester materials suitable for these optical uses, where the polyester materials are copolyester polymeric material comprising substituted naphthalate units, ethylene units, and hexane units.

For the following defined terms, these definitions shall be applied, unless a different definition is given in the claims or elsewhere in this specification.

The term "polymer" will be understood to include polymers, copolymers (e.g., polymers formed using two or more different monomers), oligomers and combinations thereof, as well as polymers, oligomers, or copolymers that can be formed in a miscible blend by, for example, coextrusion or reaction, including transesterification. Both block and random copolymers are included, unless stated otherwise.

The term "polyester" as used herein refers to polymers that contain ester linkages of the general formula: —C(O) O— where C(O) is a carbonyl group C=O. Polyesters are prepared from the reaction of dicarboxylate moities (such as di-carboxylic acids or di-carboxylate alkyl esters) and diols.

The terms "Tg" and "glass transition temperature" are used interchangeably. If measured, Tg values are determined by Differential Scanning calorimetry (DSC) at a scan rate of 20° C./minute, unless otherwise indicated.

Unless otherwise stated, all numbers expressing quantities of ingredients, properties such as molecular weight, reaction conditions, and so forth used in the specification and claims are to be understood as being modified in all instances by the term "about." Accordingly, unless stated to the contrary, the numerical parameters set forth in the foregoing specification and attached claims are approximations that can vary depending upon the desired properties sought to be obtained by those skilled in the art utilizing the teachings of the present disclosure.

Mole percent or mol % and the like are synonyms that refer to the concentration of a substance as the moles of that substance divided by the moles of the composition and multiplied by 100. Similarly, weight % refers to the amount by weight of a substance in a composition divided by the total weight of the composition multiplied by 100.

The recitation of numerical ranges by endpoints includes all numbers subsumed within that range (e.g. 1 to 5 includes 1, 1.5, 2, 2.75, 3, 3.80, 4, and 5) and any range within that range.

As used in this specification and the appended claims, the singular forms "a", "an", and "the" include plural referents unless the content clearly dictates otherwise. Thus, for example, reference to a composition containing "a polymer" includes a mixture of two or more polymers. As used in this specification and the appended claims, the term "or" is generally employed in its sense including "and/or" unless the content clearly dictates otherwise.

Disclosed herein are multi-layer optical films. In some embodiments, the optical film comprises an optically active portion comprising a plurality of alternating polymeric first and second interference layers, where the number of layers is greater than 25, where the optically active portion is disposed between, and integrally formed with, first and second skin layers. The optical films may also contain additional layers as is described in detail below.

The multi-layered polymer films of this disclosure may be used, for example, as an optical reflective polarizer or mirror. The film includes optical layers comprising alternating layers of first interference layers and second interference layers, as well as non-optical layers such as skin layers. The non-optical layers typically provide protection and rigidity to the film articles. The first interference layers are generally birefringent polymer layers which are uniaxially- or biaxially-oriented. The second interference layers may also be polymer layers which are birefringent and uniaxially- or biaxially-oriented. More typically, however, the second interference layers have an isotropic index of refraction which is different from at least one of the indices of refraction of the first interference layers after orientation. The methods of manufacture and use, as well as design considerations for the multi-layered polymer films are described, for example, in U.S. Pat. No. 5,882,774 and U.S. 2001/0011779A1.

The materials used in the multi-layer optical film constructions of this disclosure include polyester materials. Polyesters include carboxylate and glycol subunits and are generated by reactions of carboxylate monomer molecules with glycol monomer molecules. Each carboxylate monomer molecule has two or more carboxylic acid or ester functional groups and each glycol monomer molecule has two or more hydroxy functional groups. The carboxylate monomer molecules may all be the same or there may be two or more different types of molecules. The same applies to the glycol monomer molecules.

Suitable carboxylate monomer molecules for use in forming the carboxylate subunits of the polyester layers include, for example, 2,6-naphthalene dicarboxylic acid and isomers thereof; terephthalic acid; isophthalic acid; phthalic acid; azelaic acid; adipic acid; sebacic acid; norbornene dicarboxylic acid; bi-cyclooctane dicarboxylic acid; 1,6-cyclohexane dicarboxylic acid and isomers thereof; t-butyl isophthalic acid, tri-mellitic acid, sodium sulfonated isophthalic acid; 4,4-biphenyl dicarboxylic acid and isomers thereof; and lower alkyl esters of these acids, such as methyl or ethyl esters. The term "lower alkyl" refers, in this context, to $C_1$-$C_{10}$ straight-chained or branched alkyl groups. Also included within the term "polyester" are polycarbonates which are derived from the reaction of glycol monomer molecules with esters of carbonic acid, and blends of polycarbonates with copolyesters made from the above comonomers.

Suitable glycol monomer molecules for use in forming glycol subunits of the polyester layers include ethylene glycol; propylene glycol; 1,4-butanediol and isomers thereof; 1,6-hexanediol; neopentyl glycol; polyethylene glycol; diethylene glycol; tricyclodecanediol; 1,4-cyclohexanedimethanol and isomers thereof; 2-butyl-2-ethyl-1,3-propane diol; 2,2,4-triethyl-1,3-pentane diol; norbornanediol; bicyclo-octanediol; trimethylol propane; pentaerythritol; 1,4-benzenedimethanol and isomers thereof; bisphenol A; 1,8-dihydroxy biphenyl and isomers thereof; and 1,3-bis(2-hydroxyethoxy)benzene.

1,4-cyclohexane dimethanol (chdm) also has been found useful for some exemplary embodiments of the present disclosure due to the inverse effect it has on the polymer properties of glass transition temperature and refractive index. Increasing the mol portion of chdm can increase the glass transition temperature of the copolymer while at the same time decrease its refractive index. In particular, copolyesters containing both tbia and chdm were found to have relatively high glass transition temperatures for their respective refractive indices.

Among the most suitable polyester materials for use in the current optical film constructions are hexanediol-containing polyester copolymers. These polyester copolymers have been found to have the proper combination of melt processability and optical properties to be particularly useful in the current optical film constructions. In some embodiments, the hexanediol-containing polyester copolymers are copolymers of substituted naphthalene dicarboxylate moieties, ethylene glycol moities, and hexanediol moities. These polymers may be viewed as modified versions of PEN (polyethylene naphthalate) where some of the ethylene moieties are replaced by hexane moieties. PEN has been found to be very useful in multi-layer optical films.

Typically, the copolymers are prepared in reaction mixtures that also contain at least one metal catalyst to facilitate the formation of the copolymers. In some embodiments, the hexanediol-containing polyester copolymers are prepared from a reaction mixture comprising 55-62 parts by weight of a substituted naphthalene dicarboxylate, 5-24 parts by weight of hexanediol, 20-35 parts by weight of ethylene glycol, and less than 0.3 parts by weight of a metal catalyst. In some embodiments, the substituted naphthalene dicarboxylate comprises dimethyl-2,6-naphthalene dicarboxylate (NDC).

Frequently polyester copolymers are described by the mol % of the units within the copolymer that are linked by ester linkages. Examples of particularly suitable hexanediol-containing polyester copolymers are ones comprising 40-51 mol % substituted naphthalate units, 10-40 mol % ethylene units, and 10-40 mol % hexane units. In some embodiments, the substituted naphthalene dicarboxylate comprises dimethyl-2,6-naphthalene dicarboxylate (NDC).

FIG. 1 shows a cross-sectional view of a first multi-layer optical film construction of this disclosure. Optical film 100 comprises a plurality of alternating polymeric first interference layers 10 and second interference layers 20, where the number of layers is greater than 25. In some embodiments, the number of layers is greater than 35, or even greater than 100. The alternating polymeric first interference layers 10 and second interference layers 20, are disposed between, and integrally formed with, first skin layer 30 and second skin layer 40.

For substantially normally incident light 50 and for each wavelength in a predetermined wavelength range 60 extending at least from about 430 nanometers (nm) to about 600 nm, the optical film has an optical reflectance of at least 40% for a first polarization state (Px). In some embodiments, the predetermined wavelength range extends at least from about 400 nm to about 650 nm, or at least from about 430 nm to about 650 nm, or from about 400 to about 600 nm. In some embodiments, the optical film has an optical reflectance of at least 50%, at least 60% or even at least 70% for a first polarization state (Px).

Each of the first and second interference layers has an average thickness less than about 250 nm. The adjacent first and second interference layers have respective in plane indices of refraction n1x and n2x along the first polarization state (Px), n1y and n2y along an orthogonal second polarization state (Py), and n1z and n2z along a z-axis orthogonal to the first and second polarization states. For at least one wavelength 61 in the predetermined wavelength range 60 extending from at least about 430 nm to at least about 600 nm, n1x is greater than each of n1y and n1z by at least 0.18. The difference between n1y and n1z is less than about 0.10. The maximum difference between n2x, n2y and n2z is less than about 0.01, and the difference between n1x and n2x is greater than about 0.18.

The first interference layer 10 comprises a hexanediol-containing polyester copolymer, the first skin layer 30 comprises polyester, and the second skin layer 40 comprises at least 70% by weight of polyethylene terephthalate (PET) and the second skin layer has an average thickness greater than about 0.5 micrometers.

The first interference layer comprises a hexanediol-containing polyester copolymer. In some embodiments, the first interference layer comprises a copolymer of substituted naphthalene dicarboxylate moities, ethylene glycol moities, and hexanediol moities. In some embodiments, more than about 95% of the first interference layer is a copolymer of substituted naphthalene dicarboxylate moities, ethylene glycol moities, and hexanediol moities. The polyester copolymer in some embodiments comprises between about 5% to about 90% by weight of one or more diol moieties. Typically, between about 30% to about 80% of the diol moieties in the first interference layer are hexanediol, with the remaining diol moities being ethylene glycol moieties. In some embodiments, at least about 40% of the diol moieties or at least 70% of the diol moities in the first interference layer are hexanediol. In some embodiments, the Tg of the first interference layer is between about 60 to about 110° C.

The first interference layer can have a wide range of thicknesses. Typically, the first interference layer and the second interference layer have the same thickness, having an average thickness of less than about 200 nm, less than about 150 nm, or between 40 and 150 nm.

The first skin layer also comprises a polyester layer. The first skin layer and the first interference layer may be same composition, or they may be different compositions. In some embodiments the first skin layer comprises polyethylene terephthalate (PET) or copolymers of PET. Copolymers of PET typically are prepared by replacing some of the 1,4-terephthalate units with 1,2- or 1,3-units. This can disrupt the crystallinity of the polymer and reduce the melting temperature. Such polymers are often referred to as co-PET. Other modified PET polymers are modified by replacing some of the ethylene glycol with a different glycol. These polymers are often referred to as glycol-modified PET of PETg. An example of PETg is EASTAR COPOLYESTER GN071 from Eastman Chemical Company.

In some embodiments the first skin layer comprises at least about 50% by weight PET, at least about 60% by weight PET, or at least about 70% by weight PET.

In some embodiments, the first skin layer comprises co-PET. The amount of co-PET can vary widely. In some embodiments, the first skin layer comprises at least about 10% by weight co-PET, at least about 20% by weight co-PET, or at least about 30% by weight co-PET.

In some embodiments, the first skin layer comprises PETg. The amount of PETg can vary widely. In some embodiments, the first skin layer comprises at least about 10% by weight PETg, at least about 20% by weight PETg, or at least about 30% by weight PETg.

In some embodiment the first skin layer comprises a polyester copolymer that comprises hexanediol, ethylene glycol, or a combination thereof.

The first skin layer can have a wide variety of thicknesses as well as a wide variety of compositions. In some embodiments, the first skin layer has an average thickness between about 0.5 and 20 micrometers. In other embodiments, the first skin layer has an average thickness that is greater than about 2 micrometers.

In some embodiments, the first skin layer has a glass transition temperature of between about 60 to about 110° C. As mentioned above, in some embodiments the first interference has a similar glass transition temperature range. In some embodiments, the first interference layer and the first skin layer have glass transition temperatures that are within 5° C. of each other.

The second interference layer can also have a wide range of compositions and thicknesses. The composition of the second interference is different from the composition of the first interference so as to give the desired optical effect. In some embodiments, the second interference layer comprises a majority of a polyester or copolyester material, in other embodiments the second interference layer comprises a majority of one or more (meth)acrylate materials. Examples of suitable polyester and copolyester materials are described above. In addition to the above materials, in some embodiments, the copolyester comprises a copolyester ether such as NEOSTAR ELASTOMER FN007 commercially available from Eastman Chemical Company are also suitable. The term "(meth)acrylate" as used herein refers to both acrylate and methacrylate materials. Acrylates and methacrylates are esters of acrylic acid or methacrylic acid, generally prepared by the reaction of the acid with an alcohol. Particularly suitable (meth)acrylate materials are polymers (PMMA) and copolymers (coPMMA) of MMA (methyl methacrylate). An example of a suitable coPMMA material is a copolymer of 75% by weight MMA and 25% by weight of ethyl acrylate such as PERSPEX CP63 commercially available from Ineos Acrylics, Inc.

In some embodiments, the second interference layer comprises a majority of polyester materials. Particularly suitable materials are PET and copolyester such as a copolyester ether. In some embodiments, the second interference layer comprises at least 80% by weight of PET, at least 90% by weight of PET, or even at least 95% by weight of PET. In other embodiments, the second interference layer comprises at least 80% by weight of a copolyester, least 90% by weight of a copolyester, or at least 95% by weight of a copolyester.

In other embodiments, the second interference layer comprises at least 50% by weight of at least one (meth)acrylate. In other embodiments, second interference layer comprises at least 60% by weight of at least one (meth)acrylate, at least 70% by weight of at least one (meth)acrylate, at least 80% by weight of at least one (meth)acrylate, at least 90% by weight of at least one (meth)acrylate, or at least 95% by weight of at least one (meth)acrylate. In some embodiments, the (meth)acrylate comprises a coPMMA. In these embodiments, the second interference layer comprises at least 50% by weight of a coPMMA. In other embodiments, second interference layer comprises at least 60% by weight of a coPMMA, at least 70% by weight of a coPMMA, at least 80% by weight of a coPMMA at least 90% by weight of a coPMMA, or at least 95% by weight of a coPMMA.

As with the other layers, the second skin layer 40, can comprise a wide range of materials and a wide range of thicknesses. The second skin layer 40 comprises at least 70% by weight of polyethylene terephthalate (PET) and has an average thickness greater than about 0.5 micrometers. In some embodiments, the average thickness of the second skin layer is greater than about 1 micrometer, greater than 10 micrometers, greater than 100 micrometers, greater than 150 micrometers, or even greater than 200 micrometers. In some embodiments, the average thickness of the second skin layer is less than about 400 micrometers, less than about 300 micrometers, less than about 200 micrometers, less than about 100 micrometers, less than about 50 micrometers, or even less than about 30 micrometers. In some embodiments, the second skin layer comprises at least 80% by weight PET, at least 85% by weight of PET, or about 90% by weight of PET. In some embodiments, the second skin layer further comprises at least about 5% by weight of PETg. In some embodiments, the second interference layer has the same composition as the first skin layer described above.

The multi-layer film articles of this disclosure may also comprise a variety of optional layers, as shown in FIG. 1. In some embodiments, the multi-layer article further comprises a first protective layer 70 disposed between the plurality of alternating polymeric first and second interference layers and the second skin layer 40. The first protective layer may have a wide range of material compositions. In some embodiments, the first protective layer and the first interference layers have substantially the same composition. The first protective layer may have a wide range of thicknesses. In some embodiments, the first protective layer has an average thickness between about 0.5 micrometers and about 20 micrometers.

In some embodiments, the multi-layer article further comprises a light diffusing layer 80 disposed on the first skin layer 30 opposite the plurality of alternating polymeric first and second interference layers. The light diffusing layer can have a wide variety of thicknesses. In some embodiments, the average thickness is between about 0.5 to about 12 micrometers. In some embodiments, the light diffusing layer comprises a plurality of particles 81 dispersed in a material 82. In some embodiments, the particles have a volume percentage of the total volume of the light diffusing layer of between about 40% to about 65%. In some embodiments, the material comprises a polyester (such as PETg or polylactic acid) and a (meth)acrylate.

A wide range of particles are suitable. In some embodiments, the particles comprise a (meth)acrylate or (meth) acrylate copolymer. In some embodiments, the particles comprise a polystyrene or polystyrene copolymer. In yet other embodiments, the particles comprise an inorganic material, such as glass. In some embodiments the average size of the particles is between about 1 micrometer to about 20 micrometers. In some embodiments, at least some of the particles in the plurality of particles protrude from a top surface of the light diffusing layer.

As mentioned above, the first and second skin layers are present in the multi-layer optical film article 100 to provide handleability and rigidity to the article. As the skin layers are relatively thick, it is desirable that they be prepared from relatively inexpensive materials, and that these layers be co-processable with the first and second interference layers. In some specific embodiments, the multi-layer optical film 100 comprises a plurality of alternating polymeric first 10 and second 20 polymeric layers numbering greater than 25, greater than 35, or even greater than 100 and disposed between, and integrally formed with, first 30 and second 40 skin layers. In these embodiments, the first skin and the first and second interference layers comprise polyester, where the first interference layer comprises a copolyester polymeric material comprising hexane diol moieties, and where the second skin layer comprises at least 70% by weight of polyethylene terephthalate (PET). The first and second skin layers, in combination, comprise at least 70% by volume of polyester. For substantially normally incident light 50 and for each wavelength in a predetermined wavelength range 60 extending at least from about 400 nm to about 600 nm, the multi-layer optical film has an optical reflectance of at least 50% for a first polarization state (Px). In some embodiments, the optical film has an optical reflectance of at least 60% for a first polarization state (Px), or even an optical reflectance of at least 70% for a first polarization state (Px). In some embodiments, the first and second skin layers, in combination, comprise at least 80% by volume of polyester.

In some embodiments, the multi-layer optical film article 100 is formed integrally and has an average thickness greater than about 200 micrometers, or an average thickness greater than about 250 micrometers.

A wide variety of methods can be used to describe the relative rigidity of the multi-layer optical articles of this disclosure. In some embodiments, the multi-layer optical articles have a flexural modulus of greater than about 1500 MPa, as measured according to the ASTM D790 test method.

In some specific embodiments, the multi-layer optical film 100 comprises a plurality of alternating polymeric first 10 and second 20 polymeric layers numbering greater than 25 and disposed between, and integrally formed with, first 30 and second 40 skin layers, where the first skin and the first and second interference layers are polyester compositions, wherein at least the first interference layer comprises a copolyester polymeric material comprising hexanediol moities. The second skin layer comprises at least 70% by weight of polyethylene terephthalate (PET). For substantially normally incident light 50 and for each wavelength in a predetermined wavelength range 60 extending at least from about 400 nm to at least about 600 nm, the optical film has an optical reflectance of at least 50% for a first polarization state (Px), and the optical film has a flexural modulus of greater than about 1500 MPa, as measured according to the ASTM D790 standard test method.

In some embodiments, the multi-layer optical film 100 has mirror-like properties, having an optical reflectance of at least 50% for the second polarization state (Py). In some embodiments, the optical reflectance is at least 60% or even 70% for the second polarization state (Py).

In some embodiments of the multi-layer mirror films the film 100 comprises a plurality of alternating polymeric first 10 and second 20 interference layers numbering greater than 100 and disposed between, and integrally formed with, first 30 and second 40 skin layers, where each of the first and second interference layers has an average thickness less than about 250 nm, and the first skin and the interference layers having respective first and second compositions comprising polyester. The second skin layer comprises at least 70% by weight of polyethylene terephthalate (PET) and had an average thickness of greater than about 100 micrometers. For substantially normally incident light 50 and for each wavelength in a predetermined wavelength range 60 extending at least from about 400 nm to at least about 600 nm, the optical film has an optical reflectance of at least 50% for each of orthogonal first (Px) and second (Py) polarization states. The adjacent first and second interference layers have respective in plane indices of refraction of: n1x and n2x along the first polarization state; n1y and n2y along the second polarization state; and n1z and n2z along a z-axis orthogonal to the first and second polarization states. For at least one wavelength 61 in the predetermined wavelength range 60: n1x is greater than each of n1y and n1z by at least 0.20, by at least 0.21, by at least 0.22, by at least 0.23, by at least 0.24, or even by at least 0.25; the difference between n1y and n1z is less than about 0.08, or even less than 0.07, in some embodiments, the difference between n1y and n1z is not greater than 0.06; the maximum difference between n2x, n2y and n2z is less than about 0.01; and the difference between n1x and n2x is greater than about 0.14.

In some embodiments the multi-layer optical film 100 is a reflective polarizer, having optical transmittance of at least 60% for the second polarization state (Py). In some embodiments, the optical transmittance is at least 70% or even 80% for the second polarization state (Py).

The multi-layer optical films of the present disclosure can be prepared in a variety of different ways. As was mentioned above, an advantage of the present disclosure is the simple and straightforward techniques that can be used to prepare the article. One particularly suitable technique for forming the articles is co-extrusion. Co-extrusion techniques are well understood by one of skill in the art. In some embodiments, the plurality of alternating polymeric first and second interference layers and the first and second skin layers are co-extruded. In some embodiments, the first and second interference layers and the first and second skin layers are co-extruded the at a temperature between about 460 and 550° F., in some embodiments at a temperature of about 500° F. In some embodiments, the plurality of alternating polymeric first and second interference layers and the first and second skin layers are further co-stretched at a temperature between about 190 and 220° F.

In this method, the multi-layer optical film is formed by co-extruding the plurality of alternating polymeric first and second interference layers and the first and second skin layers, and in some embodiments, the optical film is further formed by co-stretching the plurality of alternating polymeric first and second interference layers and the first and second skin layers at a temperature between about 190 and 220° F.

In some embodiments, the multi-layer optical film may contain additional optional layers as described above. In some embodiments, the multi-layer optical film further comprises a light diffusing layer. In some embodiments, the light diffusing layer is co-extruded with the plurality of alternating polymeric first and second interference layers and the first and second skin layers. In other embodiments, the light diffusing layer is coated on the plurality of alternating polymeric first and second interference layers.

Figure 2:
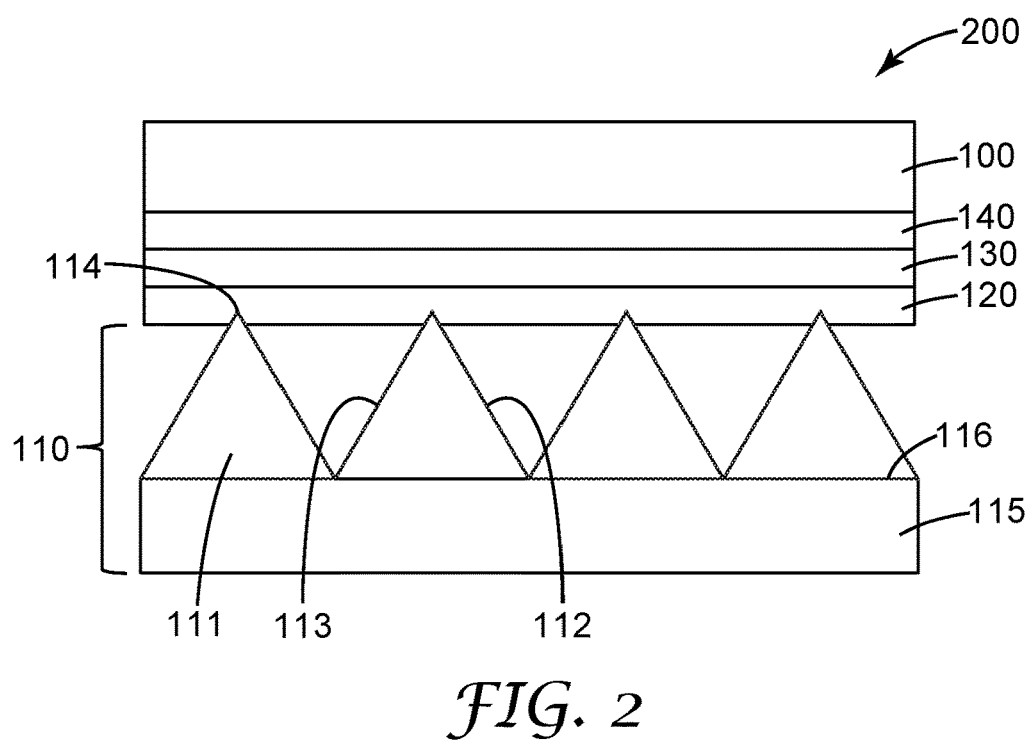
FIG. 2 is a cross-sectional view of an optical stack article of this disclosure.

Also disclosed herein are optical stack articles that comprise a multi-layer optical film article such as those described by FIG. 1 above. An embodiment of an optical stack article is shown in FIG. 2. In FIG. 2, optical stack 200 comprises a structured film 110 comprising a plurality of structures 111, each structure comprising opposing facets 112, and 113 meeting at a peak 114 with the multi-layered optical film article 100 disposed on the peaks of the structures. A first adhesive layer 120 bonds the optical film 100 to the peaks 114 of the structures 111. The optical stack has a flexural modulus of greater than about 1500 MPa, as measured according to the ASTM D790 test method. In some embodiments, the plurality of structures 111 are embedded in the first adhesive layer 120 as shown in FIG. 2. In some embodiments, the structured film 110 further comprises a first substrate 115, where the plurality of structures 111 are disposed on a major surface 116 of the first substrate 115.

Besides the structured film 110 and the multi-layered film article 100, the optical stack article can contain a variety of additional layers and features. In some embodiments the optical stack further comprises a second substrate 130 disposed between the optical film and the first adhesive layer, and a second adhesive layer 140 bonding the second substrate to the multi-layer optical film article 100. A wide range of optically clear adhesives are suitable for use as the adhesive layers 120 and 140. The adhesive layers may be the same or different.

FIG. 1 also shows a cross-sectional view of a second multi-layer optical film mirror construction of this disclosure. Optical film 100 comprises a plurality of alternating polymeric first interference layers 10 and second interference layers 20, where the number of layers is greater than 25. In some embodiments, the number of layers is greater than 35, or even greater than 100. The alternating polymeric first interference layers 10 and second interference layers 20 each have a thickness of less than 250 nm and are disposed between, and integrally formed with, first skin layer 30 and second skin layer 40.

The first skin layer comprises polyester, the first interface layers comprise a hexanediol-containing polyester copolymer, wherein at least 30% by weight of the diol moieties in the first interface layer is hexanediol. The second layer has an average thickness greater than about 100 micrometers and comprising PET.

For substantially normally incident light 50 and for each wavelength in a predetermined wavelength range 60 extending at least from about 400 nm to at least about 600 nm, the optical film having an optical reflectance of at least 50% for each of orthogonal first (Px) and second (Py) polarization states. Adjacent first and second interference layers have respective in plane indices of refraction: n1x and n2x along the first polarization state; n1y and n2y along the second polarization state; and n1z and n2z along a z-axis orthogonal to the first and second polarization states. For at least one wavelength 61 in the predetermined wavelength range: each of n1x and n1y is greater than n1z by at least 0.18; a maximum difference between n2x, n2y and n2z is less than about 0.01; and a difference between n1x and n2x is greater than about 0.18.

FIG. 1 also shows a cross-sectional view of a third multi-layer optical film construction of this disclosure. Optical film 100 comprises a plurality of alternating first polymeric layers 10 and second polymeric layers 20, where the number of layers is greater than 25. In some embodiments, the number of layers is greater than 35, or even greater than 100. The alternating first polymeric layers 10 and second polymeric layers 20 are disposed between, and integrally formed with, first skin layer 30 and second skin layer 40.

The first skin layer comprises a polyester, the first polymeric layers comprise a copolyester polymeric material with hexanediol moieties, and the second skin layer comprises at least 70% by weight PET.

For substantially normal incident light 50 and for each wavelength in a predetermined wavelength range 60 extending at least from 400 nm to at least about 600 nm, the optical film has an optical reflectance of at least 50% for a first polarization state (Px), the optical film having a flexural modulus of greater than about 1500 MPa, as measured according to ASTM D790 standard.

FIG. 1 also shows a cross-sectional view of a fourth multi-layer optical film construction of this disclosure. Optical film 100 comprises a plurality of alternating first polymeric layers 10 and second polymeric layers 20, where the number of layers is greater than 25. In some embodiments, the number of layers is greater than 35, or even greater than 100. The alternating first polymeric layers 10 and second polymeric layers 20 are disposed between, and integrally formed with, first skin layer 30 and second skin layer 40.

The first skin layer comprises a polyester, the first polymeric layers comprise a copolyester polymeric material with hexanediol moieties, and the second skin layer comprises at least 70% by weight PET.

For substantially normal incident light 50 and for each wavelength in a predetermined wavelength range 60 extending at least from 400 nm to at least about 600 nm, the optical film has an optical reflectance of at least 50% for a first polarization state (Px). The first and second skin layers, in combination, comprise at least 70% polyester by volume.

FIG. 1 also shows a cross-sectional view of a fifth multi-layer optical film construction of this disclosure. Optical film 100 comprises a plurality of alternating first polymeric layers 10 and second polymeric layers 20, where the number of layers is greater than 25. In some embodiments, the number of layers is greater than 35, or even greater than 100. The alternating first polymeric layers 10 and second polymeric layers 20 are disposed between, and integrally formed with, first skin layer 30 and second skin layer 40 and are co-extruded and then co-stretched at one or more temperatures between about 190° F. to about 220° F. with first 30 and second 40 skin layers.

Each of the first and second polymeric layers have an average thickness less than about 250 nm, the first polymeric layers comprise a polyester copolymer with hexanediol and ethylene glycol moieties. The first and the second polymeric layers have respective in-plane birefringences greater than about 0.21 and less than about 0.01.

FIG. 1 also shows a cross-sectional view of a sixth multi-layer optical film construction of this disclosure. Optical film 100 comprises a plurality of alternating first polymeric layers 10 and second polymeric layers 20, where the number of layers is greater than 25. In some embodiments, the number of layers is greater than 35, or even greater than 100. The alternating first polymeric layers 10 and second polymeric layers 20 are disposed between, and co-extruded and then co-stretched at one or more temperatures between about 190° F. to about 220° F. with, first skin layer 30 and second skin layer 40.

Each of the first and second polymeric layers have an average thickness less than about 250 nm. The first and second polymeric layers and the first and second skin layers have glass transition temperatures less than about 95° C., the first polymeric layers have in-plane birefringences greater than about 0.21.

For substantially normally incident light 50 and for at least one wavelength between about 400 nm to about 1500 nm, the optical film reflects at least 20% of the incident light having a first polarization state.

FIG. 1 also shows a cross-sectional view of a seventh multi-layer optical film construction of this disclosure. Optical film 100 comprises a plurality of alternating first polymeric layers 10 and second polymeric layers 20, where the number of layers is greater than 25. In some embodiments, the number of layers is greater than 35, or even greater than 100. The alternating first polymeric layers 10 and second polymeric layers 20 are disposed between, and co-extruded and then co-stretched at one or more temperatures between about 190° F. to about 220° F. with, first skin layer 30 and second skin layer 40.

Each of the first and second polymeric layers have an average thickness less than about 250 nm. The first and second polymeric layers and the first and second skin layers have glass transition temperatures within about 5° C. of each other, and the first polymeric layers have in-plane birefringences greater than about 0.21.

For substantially normally incident light 50 and for at least one wavelength between about 400 nm to about 1500 nm, the optical film reflects at least 20% of the incident light having a first polarization state.

The current disclosure includes the following embodiments: Among the embodiments are optical films. Embodiment 1 includes an optical film (100) comprising a plurality of alternating polymeric first (10) and second (20) interference layers numbering greater than 25 in total and disposed between, and integrally formed with, first (30) and second (40) skin layers, each of the first and second interference layers having an average thickness less than about 250 nm, the first interference layer comprising a hexanediol-containing polyester copolymer, the first skin layer comprising polyester, the second skin layer comprising at least 70% by weight of polyethylene terephthalate (PET) and having an average thickness greater than about 0.5 micrometers, for substantially normally incident light (50) and for each wavelength in a predetermined wavelength range (60) extending at least from about 430 nm to at least about 600 nm, the optical film having an optical reflectance of at least 40% for a first polarization state (Px), adjacent first and second interference layers having respective in plane indices of refraction: n1x and n2x along the first polarization state, n1y and n2y along an orthogonal second polarization state (Py), and n1z and n2z along a z-axis orthogonal to the first and second polarization states, such that for at least one wavelength (61) in the predetermined wavelength range: n1x is greater than each of n1y and n1z by at least 0.18; a difference between n1y and n1z is less than about 0.10; a maximum difference between n2x, n2y and n2z is less than about 0.01; and a difference between n1x and n2x is greater than about 0.18.

Embodiment 2 is the optical film of embodiment 1, wherein the plurality of alternating polymeric first and second interference layers number greater than 35 in total.

Embodiment 3 is the optical film of embodiment 1 or 2, wherein the plurality of alternating polymeric first and second interference layers number greater than 100.

Embodiment 4 is the optical film of any of embodiments 1-3, wherein each of the first and second interference layers has an average thickness less than about 200 nm.

Embodiment 5 is the optical film of any of embodiments 1-4, wherein each of the first and second interference layers has an average thickness less than about 150 nm.

Embodiment 6 is the optical film of any of embodiments 1-5, wherein each of the first and second interference layers has an average thickness between about 40 nm and 150 nm.

Embodiment 7 is the optical film of any of embodiments 1-6, wherein the first interference layer comprises a copolymer of substituted naphthalene dicarboxylate moieties, ethylene glycol moieties, and hexanediol moieties.

Embodiment 8 is the optical film of any of embodiments 1-7, wherein more than about 95 weight % of the first interference layer comprises a copolymer of substituted naphthalene dicarboxylate moieties, ethylene glycol moieties, and hexanediol moieties.

Embodiment 9 is the optical film of any of embodiments 1-8, wherein between about 5% to about 90% of diol moieties in the first interference layer are hexanediol.

Embodiment 10 is the optical film of any of embodiments 1-9, wherein at least about 40% of diol moieties in the first interference layer are hexanediol.

Embodiment 11 is the optical film of any of embodiments 1-10, wherein at least about 70% of diol moieties in the first interference layer are hexanediol.

Embodiment 12 is the optical film of any of embodiments 1-11, wherein between about 30% to about 80% of diol moieties in the first interference layer are hexanediol.

Embodiment 13 is the optical film of embodiment 12, wherein remaining diol moieties in the first interference layer are ethylene glycol.

Embodiment 14 is the optical film of any of embodiments 1-13, wherein the second interference layer comprises at least 80% by weight of a copolyester.

Embodiment 15 is the optical film of any of embodiments 1-14, wherein the second interference layer comprises at least 90% by weight of a copolyester.

Embodiment 16 is the optical film of any of embodiments 1-15,

Embodiment 17 is the optical film of any of embodiments 1-16, wherein the second interference layer comprises at least 95% by weight of a copolyester.

Embodiment 18 is the optical film of any of embodiments 1-13, wherein the second interference layer comprises at least 80% by weight of PETg.

Embodiment 19 is the optical film of any of embodiments 1-13, wherein the second interference layer comprises at least 90% by weight of PETg.

Embodiment 20 is the optical film of any of embodiments 1-13, wherein the second interference layer comprises at least 95% by weight of PETg.

Embodiment 21 is the optical film of any of embodiments 1-13, wherein the second interference layer comprises at least 50% by weight of an acrylate.

Embodiment 22 is the optical film of any of embodiments 1-13, wherein the second interference layer comprises at least 60% by weight of an acrylate.

Embodiment 23 is the optical film of any of embodiments 1-13, wherein the second interference layer comprises at least 70% by weight of an acrylate.

Embodiment 24 is the optical film of any of embodiments 1-13, wherein the second interference layer comprises at least 80% by weight of an acrylate.

Embodiment 25 is the optical film of any of embodiments 1-13, wherein the second interference layer comprises at least 90% by weight of an acrylate.

Embodiment 26 is the optical film of any of embodiments 1-13, wherein the second interference layer comprises at least 95% by weight of an acrylate.

Embodiment 27 is the optical film of any of embodiments 1-13, wherein the second interference layer comprises at least 50% by weight of a coPMMA.

Embodiment 28 is the optical film of any of embodiments 1-13, wherein the second interference layer comprises at least 60% by weight of a coPMMA.

Embodiment 29 is the optical film of any of embodiments 1-13, wherein the second interference layer comprises at least 70% by weight of a coPMMA.

Embodiment 30 is the optical film of any of embodiments 1-13, wherein the second interference layer comprises at least 80% by weight of a coPMMA.

Embodiment 31 is the optical film of any of embodiments 1-13, wherein the second interference layer comprises at least 90% by weight of a coPMMA.

Embodiment 32 is the optical film of any of embodiments 1-13, wherein the second interference layer comprises at least 95% by weight of a coPMMA.

Embodiment 33 is the optical film of any of embodiments 1-32, wherein the first skin and the first interference layers have the same composition.

Embodiment 34 is the optical film of any of embodiments 1-32, wherein the first skin and interference layers have different compositions.

Embodiment 35 is the optical film of any of embodiments 1-34, wherein at least one of the first skin and the first interference layers has a glass transition temperature between about 60° C. and 110° C.

Embodiment 36 is the optical film of any of embodiments 1-35, wherein the glass transition temperatures of the first skin and the first interference layers are within 5° C. of each other.

Embodiment 37 is the optical film of any of embodiments 1-36, wherein the first skin layer comprises PET.

Embodiment 38 is the optical film of any of embodiments 1-37, wherein the first skin layer comprises PET at least about 50% by weight.

Embodiment 39 is the optical film of any of embodiments 1-38, wherein the first skin layer comprises PET at least about 60% by weight.

Embodiment 40 is the optical film of any of embodiments 1-39, wherein the first skin layer comprises PET at least about 70% by weight.

Embodiment 41 is the optical film of any of embodiments 1-36, wherein the first skin layer comprises a co-PET.

Embodiment 42 is the optical film of any of embodiments 1-36, wherein the first skin layer comprises a co-PET at least about 10% by weight.

Embodiment 43 is the optical film of any of embodiments 1-36, wherein the first skin layer comprises a co-PET at least about 20% by weight.

Embodiment 44 is the optical film of any of embodiments 1-36, wherein the first skin layer comprises a co-PET at least about 30% by weight.

Embodiment 45 is the optical film of any of embodiments 1-36, wherein the first skin layer comprises PETg.

Embodiment 46 is the optical film of any of embodiments 1-36, wherein the first skin layer comprises PETg at least about 10% by weight.

Embodiment 47 is the optical film of any of embodiments 1-36, wherein the first skin layer comprises PETg at least about 20% by weight.

Embodiment 48 is the optical film of any of embodiments 1-36, wherein the first skin layer comprises PETg at least about 30% by weight.

Embodiment 49 is the optical film of any of embodiments 1-48, wherein the first skin layer comprises hexanediol moieties.

Embodiment 50 is the optical film of any of embodiments 1-49, wherein the first skin layer comprises ethylene glycol moieties.

Embodiment 51 is the optical film of any of embodiments 1-50, wherein the first skin layer and the second interference layers have a same composition.

Embodiment 52 is the optical film of any of embodiments 1-51, wherein the first skin layer has an average thickness greater than about 2 micrometers.

Embodiment 53 is the optical film of any of embodiments 1-51, wherein the first skin layer has an average thickness between about 0.5 and 20 micrometers.

Embodiment 54 is the optical film of any of embodiments 1-53, wherein the second skin layer comprises at least 80% by weight of polyethylene terephthalate (PET).

Embodiment 55 is the optical film of any of embodiments 1-54, wherein the second skin layer comprises at least 85% by weight of PET.

Embodiment 56 is the optical film of any of embodiments 1-55, wherein the second skin layer comprises about 90% by weight of PET.

Embodiment 57 is the optical film of any of embodiments 1-53, wherein the second skin layer further comprises at least about 5% by weight of PETg.

Embodiment 58 is the optical film of any of embodiments 1-57, wherein the average thickness of the second skin layer is greater than about 1 micrometer.

Embodiment 59 is the optical film of any of embodiments 1-58, wherein the average thickness of the second skin layer is greater than about 10 micrometers.

Embodiment 60 is the optical film of any of embodiments 1-59, wherein the average thickness of the second skin layer is less than about 400 micrometers.

Embodiment 61 is the optical film of any of embodiments 1-60, wherein the average thickness of the second skin layer is less than about 300 micrometers.

Embodiment 62 is the optical film of any of embodiments 1-61, wherein the average thickness of the second skin layer is less than about 200 micrometers.

Embodiment 63 is the optical film of any of embodiments 1-62, wherein the average thickness of the second skin layer is less than about 100 micrometers.

Embodiment 64 is the optical film of any of embodiments 1-62, wherein the average thickness of the second skin layer is less than about 50 micrometers.

Embodiment 65 is the optical film of any of embodiments 1-63, wherein the average thickness of the second skin layer is less than about 30 micrometers.

Embodiment 66 is the optical film of any of embodiments 1-58, wherein the average thickness of the second skin layer is greater than about 100 micrometers.

Embodiment 67 is the optical film of any of embodiments 1-58, wherein the average thickness of the second skin layer is greater than about 150 micrometers.

Embodiment 68 is the optical film of any of embodiments 1-58, wherein the average thickness of the second skin layer is greater than about 200 micrometers.

Embodiment 69 is the optical film of any of embodiments 1-68, wherein the first and second skin layers, in combination, comprise at least 80% by volume of polyester.

Embodiment 70 is the optical film of any of embodiments 1-69, wherein the difference between n1y and n1z is less than about 0.08.

Embodiment 71 is the optical film of any of embodiments 1-69, wherein the difference between n1y and n1z is not greater than about 0.06.

Embodiment 72 is the optical film of any of embodiments 1-69, wherein the difference between n1y and n1z is less than about 0.07.

Embodiment 73 is the optical film of any of embodiments 1-72, wherein n1x is greater than each of n1y and n1z by at least 0.2.

Embodiment 74 is the optical film of any of embodiments 1-73, wherein n1x is greater than each of n1y and n1z by at least 0.21.

Embodiment 75 is the optical film of any of embodiments 1-74, wherein n1x is greater than each of n1y and n1z by at least 0.22.

Embodiment 76 is the optical film of any of embodiments 1-75, wherein n1x is greater than each of n1y and n1z by at least 0.23.

Embodiment 77 is the optical film of any of embodiments 1-76, wherein n1x is greater than each of n1y and n1z by at least 0.24.

Embodiment 78 is the optical film of any of embodiments 1-77, wherein n1x is greater than each of n1y and n1z by at least 0.25.

Embodiment 79 is the optical film of any of embodiments 1-78, having an optical reflectance of at least 50% for the first polarization state (Px).

Embodiment 80 is the optical film of any of embodiments 1-79, having an optical reflectance of at least 60% for a first polarization state (Px).

Embodiment 81 is the optical film of any of embodiments 1-80, having an optical reflectance of at least 70% for a first polarization state (Px).

Embodiment 82 is the optical film of any of embodiments 1-81, wherein the predetermined wavelength range extends from about 430 nm to about 650 nm.

Embodiment 83 is the optical film of any of embodiments 1-81, wherein the predetermined wavelength range extends from about 400 nm to about 650 nm.

Embodiment 84 is the optical film of any of embodiments 1-83, having an optical reflectance of at least 50% for the second polarization state.

Embodiment 85 is the optical film of any of embodiments 1-84, having an optical reflectance of at least 60% for the second polarization state.

Embodiment 86 is the optical film of any of embodiments 1-85, having an optical reflectance of at least 70% for the second polarization state.

Embodiment 87 is the optical film of any of embodiments 1-83, having an optical transmittance of at least 60% for the second polarization state.

Embodiment 88 is the optical film of any of embodiments 1-83, having an optical transmittance of at least 70% for the second polarization state.

Embodiment 89 is the optical film of any of embodiments 1-83 having an optical transmittance of at least 80% for the second polarization state.

Embodiment 90 is the optical film of any of embodiments 1-89, formed integrally and having an average thickness greater than about 200 micrometers.

Embodiment 91 is the optical film of any of embodiments 1-89, formed integrally and having an average thickness greater than about 250 micrometers.

Embodiment 92 is the optical film of any of embodiments 1-89, formed integrally and having an average thickness greater than about 50 micrometers.

Embodiment 93 is the optical film of embodiment 92, wherein the plurality of alternating polymeric first and second interference layers and the first and second skin layers are further co-stretched at a temperature between about 190 and 220° F.

Embodiment 94 is the optical film of any of embodiments 1-91 formed by co-extruding the plurality of alternating polymeric first and second interference layers and the first and second skin layers.

Embodiment 95 is the optical film of embodiment 94, further formed by co-stretching the plurality of alternating polymeric first and second interference layers and the first and second skin layers at a temperature between about 190 and 220° F.

Embodiment 96 is the optical film of any of embodiments 1-95, having a flexural modulus of greater than about 1500 MPa, as measured according to ASTM D790 standard.

Embodiment 97 is the optical film of any of embodiments 1-96, further comprising a first protective layer 70 disposed between the plurality of alternating polymeric first and second interference layers and the second skin layer.

Embodiment 98 is the optical film of embodiment 97, wherein the first protective layer and the first interference layers have substantially the same composition.

Embodiment 99 is the optical film of embodiment 97 or 98, wherein the first protective layer has an average thickness between about 0.5 micrometers and about 20 micrometers.

Embodiment 100 is the optical film of any of embodiments 1-99, further comprising a light diffusing layer (80) disposed on the first skin layer opposite the plurality of alternating polymeric first and second interference layers.

Embodiment 101 is the optical film of embodiment 100, wherein light diffusing layer is co-extruded with the plurality of alternating polymeric first and second interference layers and the first and second skin layers.

Embodiment 102 is the optical film of embodiment 100, wherein light diffusing layer is coated on the plurality of alternating polymeric first and second interference layers.

Embodiment 103 is the optical film of any of embodiments 100-102, wherein the light diffusing layer comprises a plurality of particles (81) dispersed in a material (82).

Embodiment 104 is the optical film of embodiment 103, wherein the material comprises polyester and an acrylate.

Embodiment 105 is the optical film of embodiment 103 or 104, wherein the particles comprise an acrylate.

Embodiment 106 is the optical film of embodiment 103 or 104, wherein the particles comprise an inorganic material.

Embodiment 107 is the optical film of embodiment 106, wherein the inorganic material comprises glass.

Embodiment 108 is the optical film of embodiment 103 or 104, wherein the particles comprise a polystyrene.

Embodiment 109 is the optical film of any of embodiments 103-108, wherein the particles have a volume percentage of a total volume of the light diffusing layer between about 40% to about 65%.

Embodiment 110 is the optical film of any of embodiments 103-109, wherein an average size of the particles is between about 1 micrometer to about 20 micrometers.

Embodiment 111 is the optical film of any of embodiments 103-110, wherein at least some of the particles in the plurality of particles protrude from a top surface of the light diffusing layer.

Embodiment 112 is the optical film of any of embodiments 100-111, wherein the light diffusing layer has an average thickness between about 0.5 to about 12 micrometers.

Embodiment 113 is an optical film (100) comprising a plurality of alternating polymeric first (10) and second (20) interference layers numbering greater than 25 in total and disposed between, and integrally formed with, first (30) and second (40) skin layers, each of the first and second interference layers having an average thickness less than about 250 nm, the first skin layer comprising polyester, the first interference layers comprising a hexanediol-containing polyester copolymer, wherein at least 30% by weight of diol moieties in the first interference layer is hexanediol, the second skin layer having an average thickness greater than about 100 micrometers and comprising polyethylene terephthalate (PET), and, for substantially normally incident light (50) and for each wavelength in a predetermined wavelength range (60) extending at least from about 400 nm to at least about 600 nm, the optical film having an optical reflectance of at least 50% for each of orthogonal first (Px) and second (Py) polarization states, adjacent first and second interference layers having respective in plane indices of refraction: n1x and n2x along the first polarization state, n1y and n2y along the second polarization state, and n1z and n2z along a z-axis orthogonal to the first and second polarization states, such that for at least one wavelength (61) in the predetermined wavelength range: each of n1x and n1y is greater than n1z by at least 0.18; a maximum difference between n2x, n2y and n2z is less than about 0.01; and a difference between n1x and n2x is greater than about 0.18.

Embodiment 114 is an optical film (100) comprising a plurality of alternating first (10) and second (20) polymeric layers numbering greater than 25 and disposed between, and integrally formed with, first (30) and second (40) skin layers, the first skin layer comprising polyester, the first polymeric layers comprising a hexanediol-containing polyester copolymer, the second skin layer comprising at least 70% by weight of polyethylene terephthalate (PET), for substantially normally incident light (50) and for each wavelength in a predetermined wavelength range (60) extending at least from about 400 nm to at least about 600 nm, the optical film having an optical reflectance of at least 50% for a first polarization state (Px), the optical film having a flexural modulus of greater than about 1500 MPa, as measured according to ASTM D790 standard.

Embodiment 115 is an optical film (100) comprising a plurality of alternating first (10) and second (20) polymeric layers numbering greater than 25 and disposed between, and integrally formed with, first (30) and second (40) skin layers, the first skin layer comprising polyester, the first polymeric layers comprising a hexanediol-containing polyester copolymer, the second skin layer comprising at least 70% by weight of polyethylene terephthalate (PET), for substantially normally incident light (50) and for each wavelength in a predetermined wavelength range (60) extending at least from about 400 nm to about 600 nm, the optical film having an optical reflectance of at least 50% for a first polarization state (Px), wherein the first and second skin layers, in combination, comprise at least 70% polyester by volume.

Embodiment 116 is an optical film (100) comprising a plurality of alternating first (10) and second (20) polymeric layers numbering greater than 25 in total and disposed between, and co-extruded and then co-stretched at one or more temperatures between about 190° F. to about 220° F., with first (30) and second (40) skin layers, each of the first and second polymeric layers having an average thickness less than about 250 nm, the first polymeric layers comprising a polyester, hexanediol and ethylenediol copolymer, wherein the first and the second polymeric layers have respective in-plane birefringences greater than about 0.21 and less than about 0.1.

Embodiment 117 is an optical film (100) comprising a plurality of alternating first (10) and second (20) polymeric layers numbering greater than 25 in total and disposed between, and co-extruded and then co-stretched at one or more temperatures between about 190° F. to about 220° F., with first (30) and second (40) skin layers, each of the first and second polymeric layers having an average thickness less than about 250 nm, the first and second polymeric layers and the first and second skin layers having glass transition temperatures less than about 95° C., the first polymeric layers having in-plane birefringences greater than about 0.21, wherein for substantially normally incident light and for at least one wavelength between about 400 nm to about 1500 nm, the optical film reflects at least 20% of the incident light having a first polarization state.

Embodiment 118 is an optical film (100) comprising a plurality of alternating first (10) and second (20) polymeric layers numbering greater than 25 in total and disposed between, and co-extruded and then co-stretched at one or more temperatures between about 190° F. to about 220° F., with first (30) and second (40) skin layers, each of the first and second polymeric layers having an average thickness less than about 250 nm, the first and second polymeric layers and the first and second skin layers having glass transition temperatures within about 5° C. of each other, the first polymeric layers having in-plane birefringences greater than about 0.21, wherein for substantially normally incident light and for at least one wavelength between about 400 nm to about 1500 nm, the optical film reflects at least 20% of the incident light having a first polarization state.

Also disclosed are optical stacks. Embodiment 119 is an optical stack (200) comprising: a structured film (110) comprising a plurality of structures (111), each structure comprising opposing facets (112, 113) meeting at a peak (114); the optical film of any of embodiments 1-118 disposed on the peaks of the structures; and a first adhesive layer (120) bonding the optical film to the peaks of the structures, the optical stack having a flexural modulus of greater than about 1500 MPa, as measured according to ASTM D790 standard.

Embodiment 120 is the optical stack of embodiment 119, wherein the peaks of at least some of the structures in the plurality of structures are embedded in the first adhesive layer.

Embodiment 121 is the optical stack of embodiment 119 or 120, wherein the structured film further comprises a first substrate (115), the plurality of structures disposed on a major surface (116) of the first substrate.

Embodiment 122 is the optical stack of any of embodiments 119-121, further comprising a second substrate (130) disposed between the optical film and the first adhesive layer, a second adhesive layer (140) bonding the second substrate to the optical film.

Also disclosed are copolyester polymeric materials. Embodiment 123 is a copolyester polymeric material comprising: the reaction product of a reaction mixture comprising:

55-62 parts by weight of a substituted naphthalene dicarboxylate moieties;

5-24 parts by weight of hexanediol moieties;

20-35 parts by weight of ethylene glycol moieties; and less than 0.3 parts by weight of a metal catalyst.

Embodiment 124 is the copolyester polymeric material of embodiment 123, wherein the substituted naphthalene dicarboxylate comprises dimethyl-2,6-naphthalene dicarboxylate (NDC).

Embodiment 125 is a copolyester polymeric material comprising:

40 to 51 mol % substituted naphthalate units;

10 to 40 mol % ethylene units; and 10 to 40 mol % hexane units.

EXAMPLES

These examples are merely for illustrative purposes only and are not meant to be limiting on the scope of the appended claims. All parts, percentages, ratios, etc. in the examples and the rest of the specification are by weight, unless noted otherwise. Solvents and other reagents used were obtained from Sigma-Aldrich Chemical Company; Milwaukee, Wis. unless otherwise noted. The following abbreviations are used: RPM=revolutions per minute; psig=pounds per square inch gauge; g=grams; lb=pounds; kPa=kiloPascals; dL=deciliters; hrs=hours; mol %=mole percent. The terms "weight %", "% by weight", and "wt %" are used interchangeably.

| Table of Abbreviations | |
|---|---|
| Abbreviation or Trade Designation | Description |
| NDC | Dimethyl-2,6-Naphthalene Dicarboxylate |
| EG | Ethylene Glycol |
| HD | Hexanediol |
| TBT | Tetrabutyl Titanate |

Test Methods

Determination of Tg by Differential Scanning calorimetry (DSC):

The materials were tested using DSC (Q2000 commercially available from TA Instruments, New Castle, Del.). A sample of about 5-10 mg was used for each composition. The test involved a 3-stage heating-cooling-heating temperature ramp at a temperature range of 30-290° C. The sample was held at 290° C. for 3 min after the first heat. The ramp rate was 20° C./min for both heating and cooling. Both the first heating scan and the second heating scan were analyzed.

Procedure for Measuring Refractive Index (RI):

The refractive indices of the various samples were measured using a Metricon Prism coupler (Metricon Corporation, Pennington, N.J.) in the MD, TD, and TM directions. MD and TD are in-plane directions and TM is normal to the film surface. The refractive indices of MD, TD and TM are labeled as: $N_x$, $N_y$, and $N_z$, respectively.

Procedure for Measuring Optical Properties:

Films were tested for Transmittance (T, %), Haze (H, %), and Clarity (C, %) using a Hazeguard® instrument from BYK-Garner USA. Transmittance and haze were measured according to ASTM D-1003. Clarity was measured according to the test methods described in the manual for the instrument.

Examples 1-8

Part A: Synthesis of Polyhexylethylene Naphthalate Copolymers:

A series of polyhexylethylene naphthalate copolymers were produced using the following procedure using the components listed in Table 1: To a room temperature stainless steel 10-gallon reactor equipped with hot oil temperature control, an overhead separation column and a vacuum pump. The materials were heated and mixed at 125 rpm under 20 psig (138 kPa) of $N_2$. The transesterification reaction was driven over the course of ~2 hours to a temp of 495° F. (257° C.). Methanol was driven off through the separation column and collected in a receiver. The pressure in the kettle was slowly bled down to atmospheric and vacuum was applied to the kettle and increased as batch viscosity allowed. Excess ethylene glycol was driven off. After ~2 hours at a temp of ~545° F. (285° C.) and a vacuum as low as ~1 mmHg, the reaction progressed to the desired endpoint (equivalent to 0.48 dL/g viscosity for PEN). The kettle was drained, and the resin was allowed to cool and was later ground-up into small pieces for further evaluation. The mol % of HD was calculated based on the assumption that all excess diol driven off was EG.

Figure 3:
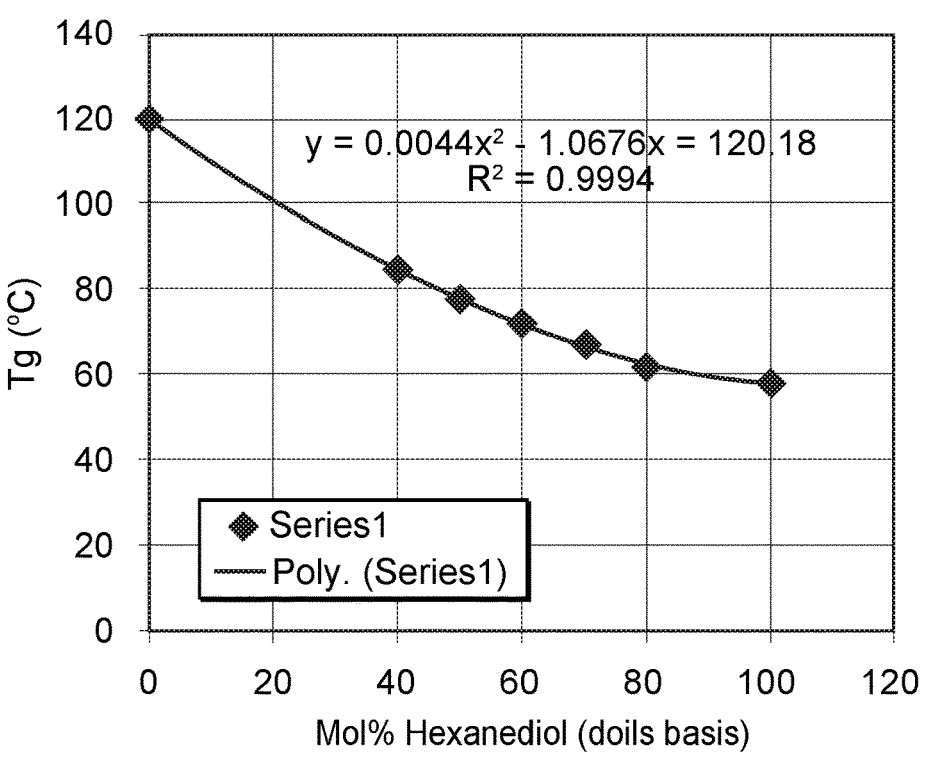
FIG. 3 is graph showing the correlation of Tg to mol % hexanediol in copolymers of this disclosure.

FIG. 3 shows a graph of the Tg values for the copolymers of Examples 1-8 as well as for PEN (0 mol % HD).

TABLE 1

| | Example | | | | | | | |
|---|---|---|---|---|---|---|---|---|
| | 1 | 2 | 3 | 4 | 5 | 6 | 7 | 8 |
| Mol % of HD | 20 | 10 | 5 | 60 | 80 | 100 | 40 | 40 |
| NDC (lb) | 40 | 40 | 40 | 38 | 38 | 38 | 38 | 38 |
| HD (lb) | 3.87 | 1.94 | 0.97 | 11.03 | 14.71 | 18.39 | 7.36 | 7.36 |
| EG (lb) | 21.35 | 22.37 | 22.88 | 16.42 | 14.49 | 12.56 | 18.35 | 18.35 |
| TBT (g) | 0.91 | 1.36 | 1.36 | 1.29 | 1.73 | 2.16 | 1.73 | 2.59 |

Part B: Film Making

A series of films were produced using these resins of Examples 1-8 above in the following fashion: A twin-screw extruder w/vacuum was connected to melt train consisting of a gear pump, and neck tube which fed to a feed block and die. The extruder and melt train utilized a progressive temp profile with the bulk of the melt train at 500° F. (260° C.). The resins were extruded at 15 lb/hr and cast on to a 100° F. (37° C.) chill roll producing 12 mil (305 micrometer) thick cast web films.

Part C:

Orientation of Films

The cast films were then constrained uniaxially oriented using a KARO lab orientation device. Orientation for each material was explored at various temperatures typically in the range where PET films are oriented (90 to 110° C.). Birefringence and haze were measured on the resultant films. Table 2 below shows the result of the orientation. Comparative Example 1 (CE-1) shows the values for PEN.

Figure 4:
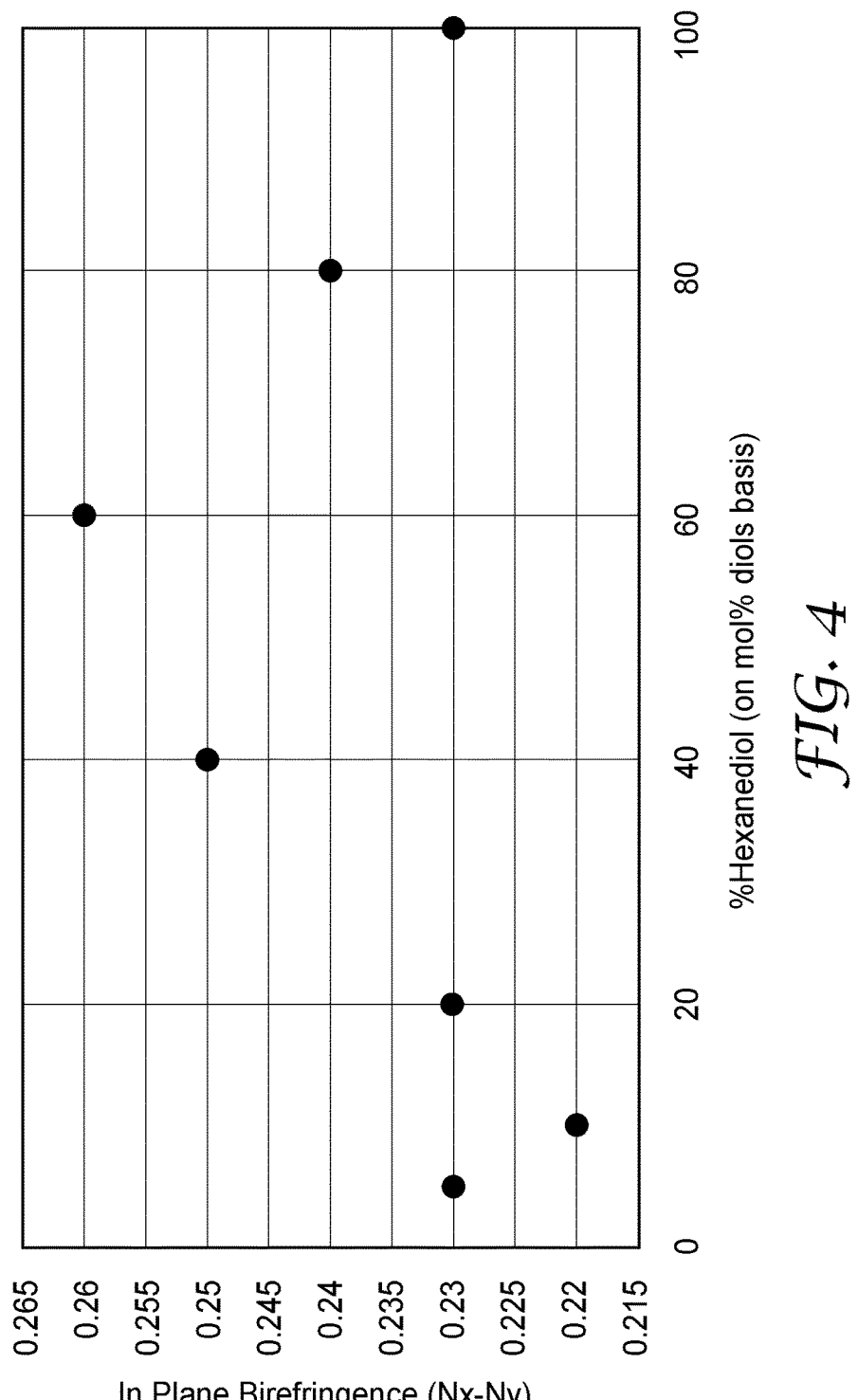
FIG. 4 is graph showing the correlation of in plane birefringence to % hexanediol in copolymers of this disclosure.

FIG. 4 graphically shows the in-plane birefringence values ($N_x$-$N_y$) for the copolymers of Examples 1-8.

TABLE 2

| Example | 1 × 6 Stretching | | | | | 1 × 5 Stretching | | | | |
|---|---|---|---|---|---|---|---|---|---|---|
| | $N_x$ | $N_y$ | $N_z$ | Stretch Temp (° C.) | Haze | $N_x$ | $N_y$ | $N_z$ | Stretch Temp (° C.) | Haze |
| 1 | 1.83 | 1.60 | 1.51 | 110-120 | High | 1.83 | 1.60 | 1.52 | 110 | High |
| 2 | 1.84 | 1.61 | 1.51 | 120-125 | Low | 1.84 | 1.61 | 1.51 | 120 | Low |
| 3 | 1.84 | 1.62 | 1.51 | 130-140 | Low | 1.84 | 1.61 | 1.50 | 125 | Low |
| 4 | 1.83 | 1.57 | 1.52 | 85-95 | Low | 1.84 | 1.58 | 1.52 | 80 | Low |
| 5 | 1.81 | 1.59 | 1.52 | 75-85 | Low | 1.81 | 1.56 | 1.53 | 70 | High |
| 6 | 1.79 | 1.58 | 1.52 | 70-75 | Low | 1.79 | 1.57 | 1.52 | 65 | Low |
| 7 | 1.83 | 1.58 | 1.52 | 100-110 | Low | 1.81 | 1.59 | 1.52 | 95 | Low |
| 8 | 1.83 | 1.59 | 1.51 | 105-120 | Low | 1.81 | 1.59 | 1.52 | 100 | Low |
| CE-1 | 1.83 | 1.62 | 1.51 | 135-150 | — | — | — | — | — | — |

What is claimed is:

1. An optical film comprising a plurality of alternating polymeric first and second interference layers numbering greater than 25 in total and disposed between, and integrally formed with, first and second skin layers, each of the first and second interference layers having an average thickness less than about 250 nm, the first interference layers comprising a substituted naphthalate, hexanediol and ethylenediol copolymer, the first skin layer comprising polyester, at least one of the first skin and the first interference layers having a glass transition temperature between about 60°° C. and 110°° C., the second skin layer comprising at least 70% by weight of polyethylene terephthalate and having an average thickness greater than about 0.5 micrometers, for substantially normally incident light and for each wavelength in a predetermined wavelength range extending at least from about 430 nm to at least about 600 nm, the optical film having an optical reflectance of at least 40% for a first polarization state, adjacent first and second interference layers having respective in plane indices of refraction:

n1x and n2x along the first polarization state, n1y and n2y along an orthogonal second polarization state, and n1z and n2z along a z-axis orthogonal to the first and second polarization states, such that for at least one wavelength in the predetermined wavelength range:

n1x is greater than each of n1y and n1z by at least 0.18;

a difference between n1y and n1z is less than about 0.10;

a maximum difference between n2x, n2y and n2z is less than about 0.01; and a difference between n1x and n2x is greater than about 0.18.

2. The optical film of claim 1, wherein glass transition temperatures of the first skin and the first interference layers are within 5°° C. of each other, wherein the optical film is formed integrally and has an average thickness greater than about 50 micrometers, and wherein the plurality of alternating polymeric first and second interference layers and the first and second skin layers are co-extruded and further co-stretched at a temperature between about 190 and 220° F.

3. An optical stack comprising:

a structured film comprising a plurality of structures, each structure comprising opposing facets meeting at a peak;

the optical film of claim 1 disposed on the peaks of the structures; and a first adhesive layer bonding the optical film to the peaks of the structures, the optical stack having a flexural modulus of greater than about 1500 MPa, as measured according to ASTM D790 standard.

4. An optical film comprising a plurality of alternating polymeric first and second interference layers numbering greater than 25 in total and disposed between, and integrally formed with, first and second skin layers, each of the first and second interference layers having an average thickness less than about 250 nm, the first skin layer comprising polyester, the first interference layers comprising a substituted naphthalate, hexanediol and ethylenediol copolymer, wherein at least 30% by weight of diol moieties in the first interference layer is hexanediol, the second skin layer having an average thickness greater than about 100 micrometers and comprising at least 70% by weight of polyethylene terephthalate, and, for substantially normally incident light and for each wavelength in a predetermined wavelength range extending at least from about 400 nm to at least about 600 nm, the optical film having an optical reflectance of at least 50% for each of orthogonal first and second polarization states, adjacent first and second interference layers having respective in plane indices of refraction:

n1x and n2x along the first polarization state, n1y and n2y along the second polarization state, and n1z and n2z along a z-axis orthogonal to the first and second polarization states, such that for at least one wavelength in the predetermined wavelength range:

each of n1x and n1y is greater than n1z by at least 0.18;

a maximum difference between n2x, n2y and n2z is less than about 0.01; and a difference between n1x and n2x is greater than about 0.18.

5. The optical film of claim 4, wherein the optical film has a flexural modulus of greater than about 1500 MPa, as measured according to ASTM D790 standard.

6. The optical film of claim 4, wherein the first and second skin layers, in combination, comprise at least 70% polyester by volume.

7. The optical film of claim 4, wherein the plurality of alternating polymeric first and second interference layers and the first and second skin layers are co-extruded and then co-stretched at one or more temperatures between about 190° F. to about 220° F., the first polymeric layers having in-plane birefringences greater than about 0.21.

8. An optical film comprising a plurality of alternating first and second polymeric layers numbering greater than 25 in total and disposed between, and co-extruded and then co-stretched at one or more temperatures between about 190° F. to about 220° F., with first and second skin layers, each of the first and second polymeric layers having an average thickness less than about 250 nm, the first and second polymeric layers and the first and second skin layers having glass transition temperatures less than about 95° C., the first polymeric layers having in-plane birefringences greater than about 0.21, the second skin layer comprising at least 70% by weight of polyethylene terephthalate, wherein for substantially normally incident light and for at least one wavelength between about 400 nm to about 1500 nm, the optical film reflects at least 20% of the incident light having a first polarization state, wherein the first polymeric layers comprise a copolyester polymeric material comprising:

40 to 51 mol % substituted naphthalate units;

10 to 40 mol % ethylene units; and 10 to 40 mol % hexane units.

9. The optical film of claim 8, wherein the substituted naphthalate units comprise dimethyl-2,6-naphthalene dicarboxylate.

10. An optical film comprising a plurality of alternating first and second polymeric layers numbering greater than 25 in total and disposed between, and co-extruded and then co-stretched at one or more temperatures between about 190° F. to about 220° F., with first and second skin layers, each of the first and second polymeric layers having an average thickness less than about 250 nm, the first and second polymeric layers and the first and second skin layers having glass transition temperatures within about 5°° C. of each other, the first polymeric layers having in-plane birefringences greater than about 0.21, the second skin layer comprising at least 70% by weight of polyethylene terephthalate, wherein for substantially normally incident light and for at least one wavelength between about 400 nm to about 1500 nm, the optical film reflects at least 20% of the incident light having a first polarization state, wherein the first polymeric layers comprise a copolyester polymeric material comprising:

40 to 51 mol % substituted naphthalate units;

10 to 40 mol % ethylene units; and 10 to 40 mol % hexane units.

11. The optical film of claim 10, wherein the substituted naphthalate units comprise dimethyl-2,6-naphthalene dicarboxylate.

* * * * *